(12) United States Patent
Joly

(10) Patent No.: US 6,999,580 B2
(45) Date of Patent: Feb. 14, 2006

(54) DEVICE FOR INDICATING A CALL TO AN ABSENT SUBSCRIBER

(75) Inventor: Herve Joly, Montrouge (FR)

(73) Assignee: France Telecom, Paris (FR)

( * ) Notice: Subject to any disclaimer, the term of this patent is extended or adjusted under 35 U.S.C. 154(b) by 277 days.

(21) Appl. No.: 10/235,492

(22) Filed: Sep. 6, 2002

(65) Prior Publication Data
US 2003/0043994 A1   Mar. 6, 2003

(30) Foreign Application Priority Data
Sep. 6, 2001   (FR) .................................. 01 11555

(51) Int. Cl.
H04M 1/658 (2006.01)
(52) U.S. Cl. .............................. 379/355.02; 379/88.12; 379/201.01
(58) Field of Classification Search ............. 379/88.12, 379/88.21, 142, 211.03, 355.02, 201.01
See application file for complete search history.

(56) References Cited

U.S. PATENT DOCUMENTS

| | | | |
|---|---|---|---|
| 4,672,660 A * | 6/1987 | Curtin ..................... | 379/88.19 |
| 4,930,152 A | 5/1990 | Miller | |
| 5,289,530 A | 2/1994 | Reese | |
| 5,396,548 A | 3/1995 | Bayerl et al. | |
| 5,724,412 A * | 3/1998 | Srinivasan ............... | 379/93.23 |
| 5,793,859 A * | 8/1998 | Matthews .............. | 379/211.03 |
| 5,940,484 A * | 8/1999 | DeFazio et al. ....... | 379/142.06 |
| 6,650,739 B1 * | 11/2003 | Doeberl et al. .......... | 379/88.18 |
| 2002/0087643 A1 * | 7/2002 | Parsons et al. ............. | 709/206 |

FOREIGN PATENT DOCUMENTS

| | | |
|---|---|---|
| EP | 0 978 983 A2 | 2/2000 |
| EP | 1 051 021 A2 | 11/2000 |

* cited by examiner

Primary Examiner—Sinh Tran
Assistant Examiner—Walter F Briney, III
(74) Attorney, Agent, or Firm—Young & Thompson

(57) ABSTRACT

A method and a device for indicating to an absent subscriber that he has received a call and that he has not replied. According to the invention, the number of the last caller who has called the telephone number is stored in a memory. After each storage, the stored number is transferred to a database, transferred numbers are stored in the database and a message containing an indication associated with at least one caller number stored in the database is transmitted to a contact number.

28 Claims, 3 Drawing Sheets

DEVICE FOR INDICATING A CALL TO AN ABSENT SUBSCRIBER

TECHNICAL FIELD

The present invention relates to a method and a device for indicating to a telephone subscriber that a telephone number has been called.

BACKGROUND TO THE INVENTION

This indication is a facility offered to subscribers.
Facilities of this type are known for
displaying the telephone number of a caller on the called terminal and the caller's name, if they have previously been stored in the terminal;
enabling the calling subscriber to leave the called subscriber, if the latter does not reply, a voice message which may be consulted remotely by interrogation of a server;
automatically calling back, via the called subscriber's terminal, the last caller if the called subscriber does not reply.

Although these facilities make the called subscriber aware of a call, the indications supplied to the called subscriber are limited to a mere caller number if such an indication of number is provided.

Furthermore, although voice messages enable the caller to mention his own telephone number, he may forget to do so.

Finally, the indications provided for the called subscriber are linked to the terminal replying to the called number, and the called subscriber has to be present to be aware of them.

The object of the invention is to provide a method and a device overcoming the drawbacks of the prior art.

SUMMARY OF THE INVENTION

The invention firstly relates to a method of indicating to a telephone subscriber that a telephone number has been called, in which:
the number of the last caller who has called said called number is stored in a memory associated with the called number; wherein, for indication to the called subscriber,
(a) after each storage in the memory, the stored number is transferred to a database associated with the called subscriber and capable of permanently storing a plurality of transferred numbers,
(b) transferred numbers are stored in the database associated with the called subscriber, and
(c) after at least one transfer, at least one message is automatically transmitted to at least one predetermined contact number associated with the called subscriber, the message containing an indication associated with at least one caller number stored in the data base.

Owing to the invention, a plurality of numbers corresponding to a plurality of calls received at the called subscriber's terminal may be indicated automatically to a subscriber. Furthermore, this indication is compatible with the above-mentioned existing facilities. The indication may be provided to the subscriber independently of his terminal having been called.

According to a characteristic of the invention, information for identifying subscribers for which the indication according to the above-mentioned stages (a), (b) and (c) must be made is stored beforehand in a table and stages (a), (b) and (c) are carried out when the called number corresponds to one of the items of information stored in the table.

It is thus possible to carry out the method only if the called subscriber wishes to benefit from it and to select the called numbers for which the method is carried out.

According to a further characteristic of the invention for only indicating to the called subscriber information about the last caller, the number of the last caller who has called said telephone number is stored in a second memory associated with the called number so that only this caller number is retained.

For example, the messages are transmitted in vocal form or in the form of a display on a screen to the predetermined contact number.

According to a characteristic of the invention which is simple to carry out, the indication contained in the transmitted message comprises the caller number stored in the database.

According to a characteristic of the invention for enriching the meaning of the message for a person receiving it, the indication contained in the transmitted message comprises an item of information in addition to the caller number, this item of information being stored beforehand and associated with the caller number stored in the database.

To make the indication provided for the subscriber more user-friendly, it is proposed according to a characteristic of the invention that the indication contained in the transmitted message comprises the caller name which is stored beforehand and associated with the caller number stored in the database.

According to a characteristic of the invention for extending the possibilities for reaching the calling subscriber, the indication contained in the transmitted message comprises an electronic messaging address stored beforehand and associated with the caller number stored in the database.

According to a characteristic of the invention, the indication contained in the transmitted message comprises an instant messaging identifier stored beforehand and associated with the caller number stored in the database.

According to a characteristic of the invention, the indication contained in the transmitted message comprises an item of personalizable information stored beforehand and associated with the caller number stored in the database.

According to a characteristic of the invention for guaranteeing that the transmitted message has actually been received, a preselected number of voice messages are transmitted at time intervals preselected relative to one another until the contact number replies.

To enable indications to be received remotely from the terminal connected to the called number, it is proposed according to a characteristic of the invention that the predetermined contact number is different from the called number. The contact number may obviously also be the called number.

According to a characteristic of the invention enabling the subscriber to modify the contact number at which he wishes to receive the indications, the contact number may be modified from the exterior.

The invention relates secondly to a device for indicating to a telephone subscriber that a telephone number has been called, comprising at least one switching centre associated with a first memory for the caller number, the first memory being associated with the called number, wherein it also comprises:
a database associated with the called subscriber, in which is stored at least one predetermined contact number associated with the called subscriber, the database comprising a zone for the permanent storage of a plurality of telephone numbers;

a means for automatic transfer of the telephone number stored in the first memory to the storage zone of the database; and a means for automatic sending of at least one message to the predetermined contact number, containing an indication associated with at least one number present in the storage zone of the database.

According to a further characteristic of the invention, the switching centre is associated with a table comprising a field in which are stored items of information for identifying the subscribers for whom the message must be sent and a means for comparison of the called number with the number corresponding to the information stored in the field of the table and capable of causing the storage of the caller number in the first memory in the event of identity.

According to a further characteristic of the invention, the switching centre is associated with a second memory associated with the called number and in which information for identifying the caller number is stored, the second memory being such that only the information associated with the last caller is stored therein.

According to a characteristic of the invention for remote storage of the caller numbers, the database is connected to the switching centre via at least one transit switching centre.

According to a further characteristic of the invention, extending the versatility of the device, the sending means comprise an interactive voice server for the messages which is connected to the database, means for modifying the contact number stored in the database being provided.

BRIEF DESCRIPTION OF DRAWINGS

The invention will be understood better after reading the following description which is given merely as an example with reference to the accompanying drawings, in which.

DESCRIPTION OF PREFERRED EMBODIMENT

The invention will be described hereinafter with reference to a telephone network, for example of the switched telephone network type (STN). The invention is obviously applicable to any type of telecommunications network and in particular to telecommunications networks between any type of terminal which may be other than telephone terminals and, for example, between computers.

Figure 1:
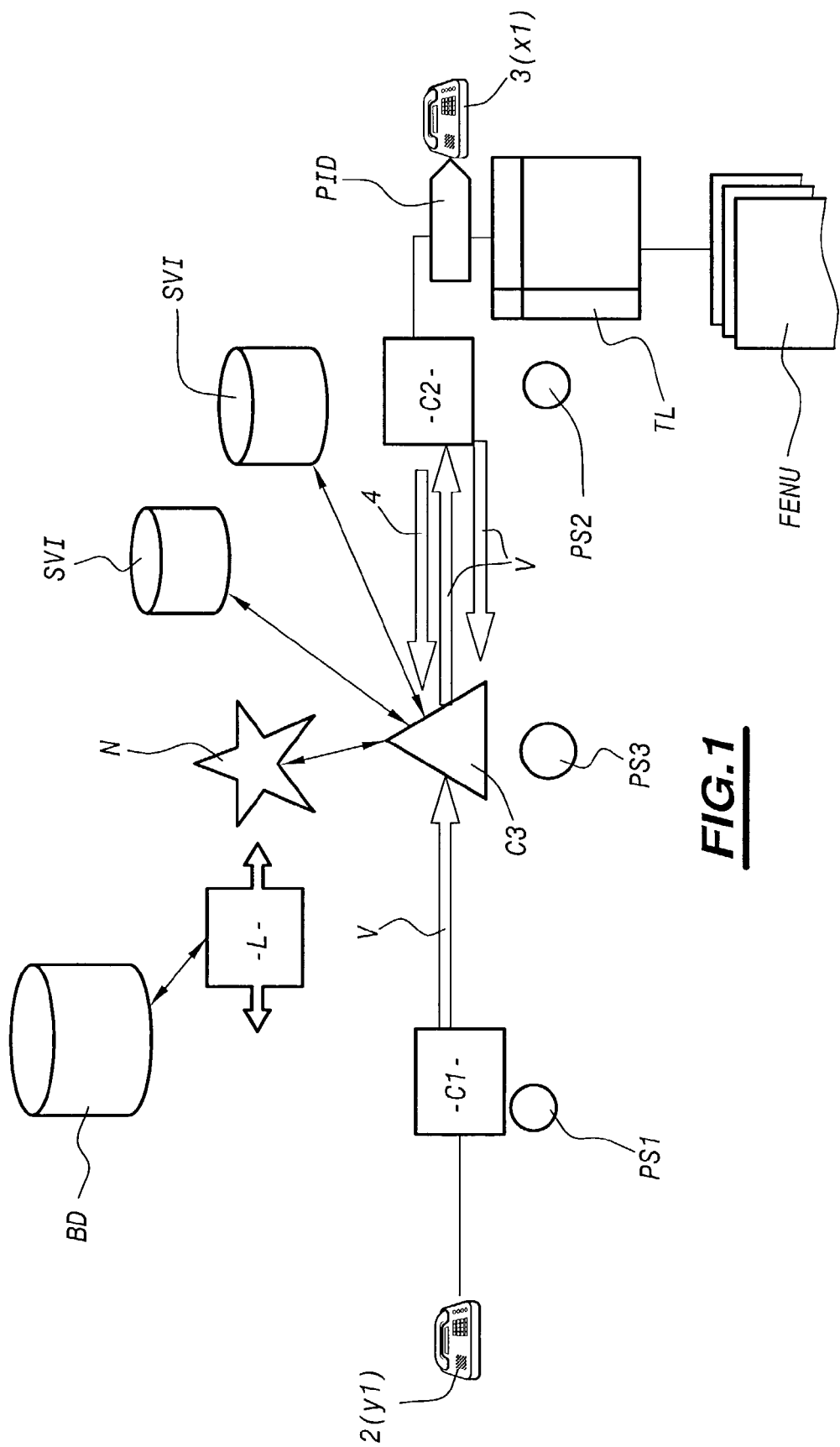
FIG. 1 is a diagram of a part of a telephone network in which the indication device and method according to the invention are employed.
Figure 2:
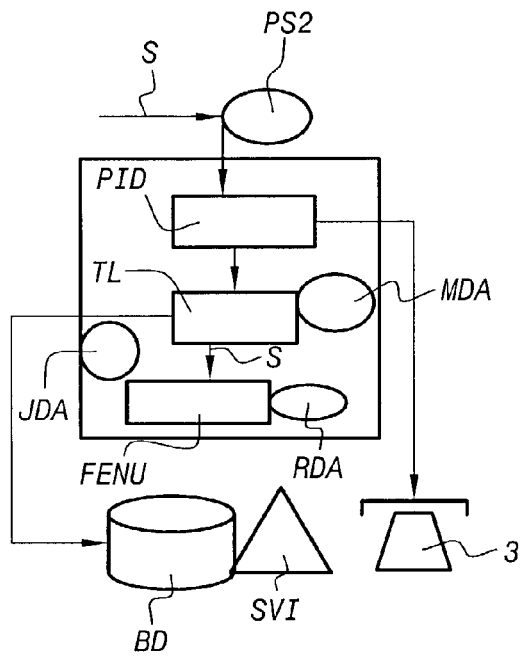
FIG. 2 is a diagram showing the course of the information relating to the calling number according to the invention.

FIG. 1 shows a telephone network 1 for establishing a communication between a plurality of telephone terminals, two terminals 2, 3 of which are shown. The invention is obviously applicable to a network 1 comprising more than two terminals. The terminals 2, 3 are, for example, fixed telephone stations. However, the terminals 2 and/or 3 may also be mobile telephones. The terminal 2 has the telephone call number y1 whereas the terminal 3 has the telephone call number x1 which is different from y1.

It is assumed that the terminal 2 known as the calling terminal 2 calls the terminal 3 known as the called terminal at its telephone number x1 in order to establish a line of communication between the terminals 2 and 3.

The calling terminal 2 is connected to an outgoing switching centre C1 whereas the terminal 3 is connected to an incoming switching centre C2. The outgoing and incoming switching centres C1, C2 are connected to one another by one or more communication nodes and links, only the transit switching centre C3 of which is shown. Lines of communication for voice signals V, represented by thick arrows in FIG. 1, may be established between the switching centres C1, C2 and C3. Semaphore signalling or signalisation points PS1, PS2 are associated with the switching centres C1, C2 and are capable of transmitting and receiving, via the signalling or signalisation network, the calling number y1, the called number x1 and the route which the voice signal V has to take through the network between the outgoing and incoming switching centres C1 and C2.

The incoming switching centre C2 comprises, downstream of the signalling point PS2, a means PID for presenting the identity of the caller, which is capable of transmitting and displaying on the screen of the terminal 3, if it has one, the calling telephone number y1 and, if applicable, additional information associated with the calling number and stored in the called terminal 3, for example the name of the subscriber corresponding to the calling number.

Figure 3:
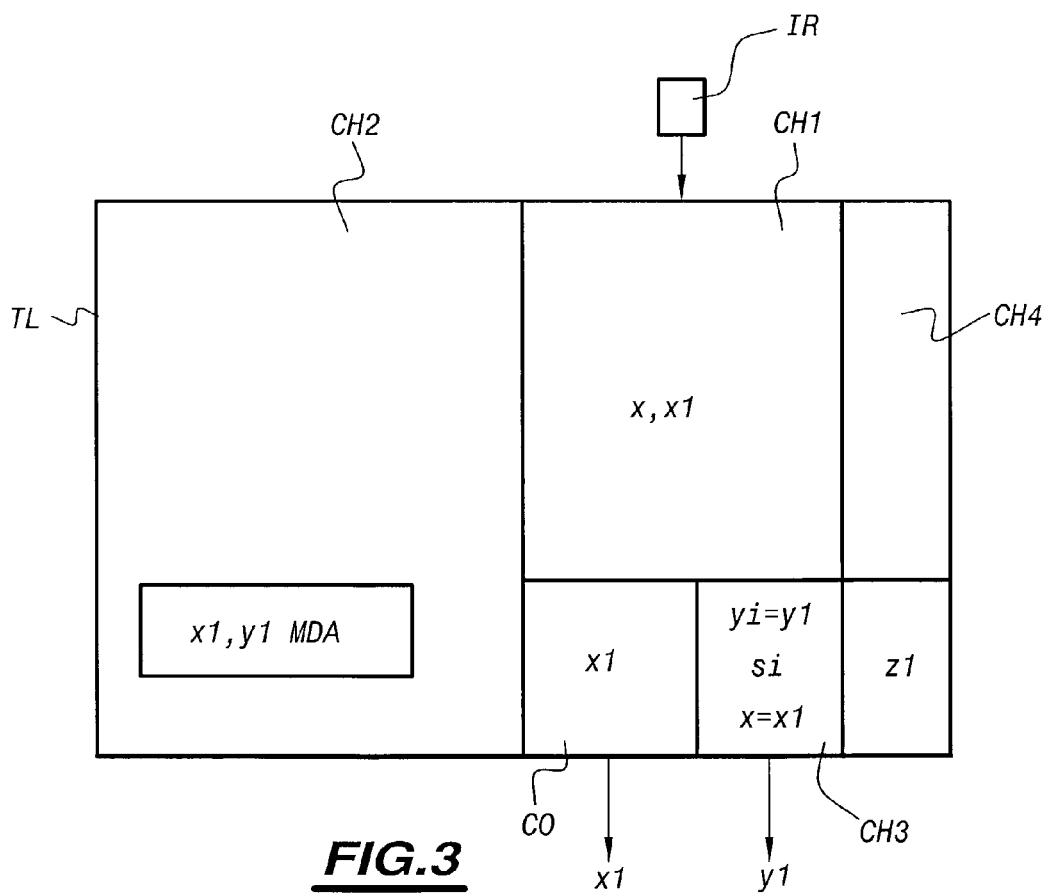
FIG. 3 is a diagram of the local table provided in the arrival switching centre for an incoming call according to the invention.
Figure 4:
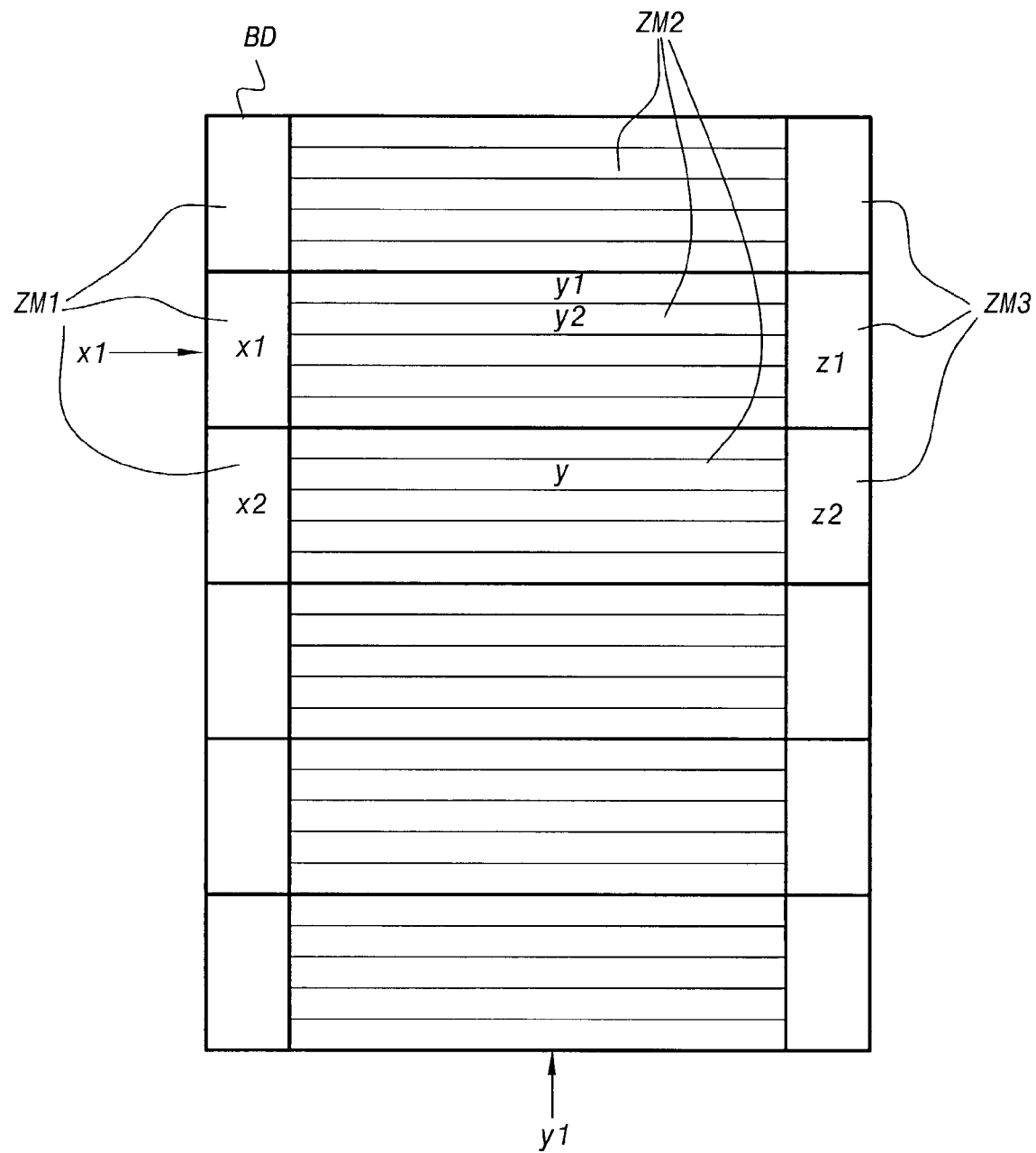
FIG. 4 is a diagram of the database used according to the invention.

Downstream of the presentation means PID is a table TL known as local table TL comprising a first field CH1 for storing preselected subscriber numbers x, as shown in FIG. 3. The table TL is associated with the switching centre C2 and forms part of it, as shown, or is connected thereto by any suitable means of telecommunications. A means IR for introducing and withdrawing subscriber numbers x in the first field CH1 is provided in the table TL.

The semaphore signalling network is capable of transporting, from the signalling point PS1 to the signalling point PS2, a signalling signal S comprising, in addition to the called subscriber number x1, the calling subscriber number y1 and the route of the voice signal V, a signalling instruction JDA for the log of the calling parties composed of a first signalling instruction MDA for storing the calling number and a second instruction RDA for calling back the last caller. The instructions JDA, MDA and RDA are present in the signalling language and protocol used.

The local table TL also comprises a second field CH2 for receiving, from the signalling point PS2, the called number x1, the calling number y1 and the first instruction MDA, as well as a comparator CO for comparing the called subscriber number x1 present in the second field CH2 of the local table with the subscriber numbers x present in the first field CH1 of the local table TL, the comparison being made, for example, by the passage of the number x1 before the numbers x.

The first signalling instruction MDA for storing the calling number causes, in the event of identity between a called subscriber number present in the first field CH1 and the called subscriber number x present in the second field CH2, provided by the comparator CO, the storage in a third field CH3 of the calling number y1 present in the second field CH2. The storage of a calling number y1 in the third field CH3 causes, via a software routine, the transfer of the number present in the third field CH3 of the local table TL and of the called number x1 present in the second field CH2 to a database BD distinct from the local table TL of the incoming switching centre C2.

The database BD is connected to the local table TL by communications lines L and nodes N comprising, for example, the transit switching centre C3.

The database BD comprises a first zone ZM1 for storing called subscriber numbers x, second zones ZM2 for storing calling numbers y1 respectively associated with the called numbers x present in the first memory zone ZM1 and third zones ZM3 for storing contact telephone numbers respectively associated with the called numbers x present in the first memory zone ZM1.

Each second memory zone ZM2 associated with a called number x, x1, x2 of the first memory zone ZM1 has a predetermined storage capacity of a plurality of calling numbers y, for example of twenty calling numbers y and is, for example, of the first in last out type (FILO).

The number y1 issuing from the third storage field CH3 of the local table TL and transferred into the database ED is stored in the second memory zone ZM2 associated with the called number x1 corresponding to the number x1 received by the database ED and transferred from the local table TL.

Means for controlling the database ED are provided to cause, after each new storage of a calling number y in a second memory zone ZM2, the transmission of a message to the telephone number present in the third associated memory zone ZM3.

An interactive voice server SV1 connected to the database BD by a communications link is provided for transmitting a message M containing an indication of the telephone numbers y1, y2 stored in the second memory zone ZM2 associated with the called number x1 to the contact number z1 stored in the memory zone ZM3 associated with the called number x1 present in the first memory zone ZM1. These indications can comprise, instead of or in addition to the telephone number y1 stored in the second memory zone ZM2, the name of the subscribers corresponding to these telephone numbers y1 and/or an electronic messaging address, stored beforehand and associated with the number y1 of the caller stored in the second memory zone ZM2 and/or an instant messaging identifier, stored beforehand and associated with the number y1 of the caller stored in the second memory zone ZM2 and/or personalizable information stored beforehand and associated with the number y1 of the caller stored in the second memory zone ZM2. These informations, other than the calling number y1, are stored, for example, in association with the telephone number y1 in a memory provided in the server SVI. These informations are obtained by the server SVI by interrogation of its memory at the address corresponding to the calling number y1 present in the second memory zone ZM2.

Each third memory zone ZM3 may be of such a size that a plurality of different contact numbers z is stored therein for the same called subscriber x and may be of the first in last out type (FILO). The message M is thus transmitted to a first contact number stored in the third memory zone ZM3 then, in the absence of a reply from this first contact number, to a second contact number stored in this same third memory zone ZM3 and so on to each contact number stored in the third zone ZM3 until one of the contact numbers z stored in the third memory zone ZM3 associated with the called number x1 replies.

The same message M may also be transmitted to a contact number z1 stored in the third memory zone ZM3 associated with the called number x1, a predetermined number of times until the called contact number z1 replies. This predetermined number of transmissions of the message is carried out, for example, only if it is verified that the contact number is a fixed, non-mobile telephone station, verification being carried out on the basis of the digits constituting the contact number z1. This predetermined number of transmissions of the message and/or the time of the day during which it will be effected is, for example, selected beforehand by the service user.

Means are provided in the interactive voice server SVI for modifying, in the third memory zone ZM3 of the database BD associated with the called number x1, the contact number or numbers z1 stored therein. This contact number z1 may be modified directly by the user by transmission of a message to the interactive voice server SVI, for example a voice message, or caused by pressing keys of a terminal.

The local table TL also comprises a fourth field CH4 for storing a contact number z1 associated with each called number x1 stored in the first field CH1. Means are provided for modifying this contact number z1 stored in the fourth field CH4 of the local table TL, each contact number z1 stored in the fourth field CH4 then being transferred, with its associated called number x1, into the third memory zone CH3 of the associated database BD where it is stored.

The message M transmitted by the interactive voice server to the contact number z1 may be a voice message created, for example, by voice synthesis or the like or a digital message causing the message to be displayed on a screen provided on the communications terminal connected to the contact number z1.

The contacts numbers z present in the third memory zone ZM3 associated with the called number x1 may be different from the associated called number x1 present in the first memory zone ZM1 of the database BD, enabling the calls received by the called number x1 to be tracked remotely. Unless it is modified (by default), the contact number z1 stored in the third memory zone ZM3 may be the called number x1 with which the third memory zone ZM3 is associated.

In the incoming switching centre C2, downstream of the local table TL, there is provided a file FENU associated with each called number x1 and in which only the last calling number y1 is stored owing to the second RDA instruction for calling back the last caller.

The local table TL is placed upstream of the file FENU for the routing of the signalling signal S, the first signalling instruction MDA for storage of the caller number being given priority over the second RDA instruction for calling back the last caller.

The file FENU is such that any new signal S which is transmitted to it and contains a calling number y1 associated with a called number x1 replaces, in the file FENU, any former caller number y stored in this file.

This caller number y1 stored in the file FENU associated with the called number x1 is called and automatically put into communication with this called number x1 when a user actuates a predetermined control button or dials a predetermined code at the terminal 3 connected to the called number x1.

What is claimed is:

1. Method of indicating to a telephone subscriber that a telephone number has been called, in which:
the number of the last caller who has called said called number is stored in a memory associated with the called number; wherein, for indication to the called subscriber,
(a) after each storage in the memory, the stored number is automatically transferred to a database associated with the called subscriber and capable of permanently storing a plurality of transferred numbers, (b) transferred numbers are stored in the database associated with the called subscriber, and (c) after at least one transfer, at least one message is automatically transmitted to at least one predetermined contact number associated with the called subscriber, the message containing an indication associated with at least one caller number stored in the data base, and information for identifying subscribers for which the indication according to stages (a), (b) and (c) must be made is stored beforehand in a table and stages (a), (b) and (c) are carried out when the called number corresponds to one of the items of information stored in the local table.

2. Method of indication according to claim 1, wherein said message is transmitted to at least one predetermined contact number for each new storage of a transferred number in the database.

3. Method of indication according to claim 1, wherein the number of the last caller who has called said telephone number is stored in a second memory associated with the called number so that only this caller number is retained.

4. Method of indication according to claim 1, wherein the messages are transmitted in vocal form or in the form of a display on a screen to a contact number.

5. Method of indication according to claim 1, wherein the indication contained in the transmitted message comprises the caller number stored in the database.

6. Method of indication according to claim 5, wherein the indication contained in the transmitted message comprises an item of information in addition to the caller number this item of information being stored beforehand and associated with the caller number stored in the database.

7. Method of indication according to claim 1, wherein the indication contained in the transmitted message comprises the caller name which is stored beforehand and associated with the caller number stored in the database.

8. Method of indication according to claim 1, wherein the indication contained in the transmitted message comprises an electronic messaging address stored beforehand and associated with the caller number stored in the database.

9. Method of indication according to claim 1, wherein the indication contained in the transmitted message comprises an instant messaging identifier stored beforehand and associated with the caller number stored in the database.

10. Method of indication according to claim 1, wherein the indication contained in the transmitted message comprises an item of personalizable information stored beforehand and associated with the caller number stored in the database.

11. Method of indication according to claim 1, wherein a preselected number of messages is transmitted at time intervals preselected relative to one another to said at least one predetermined contact number until a contact number replies.

12. Method of indication according to claim 1, wherein a plurality of predetermined contact numbers are provided, and the message is transmitted in succession to the contact numbers of said plurality for as long as the contact numbers of said plurality, to which the message has been transmitted, do not reply.

13. Method of indication according to claim 1, wherein the contact number is different from the called number.

14. Method of indication according to claim 1, wherein the contact number is identical to the called number.

15. Method of indication according to claim 1, wherein the contact number may be modified from the exterior and is registered beforehand.

16. Device for indicating to a telephone subscriber that a telephone number has been called, comprising at least one switching centre associated with a first memory for the caller number, the first memory being associated with the called number, wherein it also comprises:

a database associated with the called subscriber, in which database is stored at least one predetermined contact number associated with the called subscriber, the database comprising a zone for the permanent storage of a plurality of telephone numbers;

a means for automatic transfer of the telephone number stored in the first memory to the storage zone of the database; and a means for automatically causing, after at least one transfer, a sending of at least one message to the predetermined contact number, containing an indication associated with at least one number present in the storage zone of the database, and the switching centre is associated with a table comprising a field in which are stored items of information for identifying the subscribers for whom the message must be sent and a means for comparison of the called number with the number corresponding to the information stored in the field of the table and capable of causing the storage of the caller number in the first memory in the event of identity.

17. Indication device according to claim 16, wherein means for controlling the database are provided for causing, during each new storage of a telephone number in the storage zone of the database, the automatic sending by the sending means of said at least one message to said predetermined contact number.

18. Indication device according to claim 16, wherein the switching centre is associated with a second memory associated with the called number and in which information for identifying the caller number is stored, the second memory being such that only the information associated with the last caller is stored therein.

19. Indication device according to claim 16, wherein the database is connected to the switching centre via at least one transit switching centre.

20. Indication device according to claim 16, wherein the sending means comprise an interactive voice server for the messages which is connected to the database, means for modifying the contact number stored in the database being provided.

21. Indication device according to claim 16, wherein the sending means are such that the indication contained in the sent message comprises the caller number stored in the database.

22. Indication device according to claim 21, wherein the sending means are such that the indication contained in the sent message comprises an item of information in addition to the caller number, this item of information being stored beforehand and associated with the caller number stored in the database.

23. Indication device according to claim 16, wherein the sending means are such that the indication contained in the sent message comprises the caller name which is stored beforehand and associated with the caller number stored in the database.

24. Indication device according to claim 16, wherein the sending means are such that the indication contained in the sent message comprises an electronic messaging address stored beforehand and associated with the caller number stored in the database.

25. Indication device according to claim 16, wherein the sending means are such that the indication contained in the sent message comprises an instant messaging identifier stored beforehand and associated with the caller number stored in the database.

26. Indication device according to claim 16, wherein the sending means are such that the indication contained in the sent message comprises an item of personalizable information stored beforehand and associated with the caller number stored in the database.

27. Indication device according to claim 16, wherein the sending means is such that it transmits a preselected number of messages at time intervals which are preselected relative to one another, to said at least one predetermined contact number until a contact number replies.

28. Indication device according to claim 16, wherein a plurality of predetermined contact numbers are stored in the database, and the sending means is such that it sends said message in succession to the contact numbers of said plurality for as long as the contact numbers of said plurality, to which the message has been transmitted, do not reply.

* * * * *